United States Patent
Otani et al.

[11] Patent Number: 6,154,779
[45] Date of Patent: *Nov. 28, 2000

[54] METHOD AND APPARATUS FOR STORING RECEIVED DATA IN ASSOCIATION WITH CORRELATED INDEX INFORMATION

[75] Inventors: Kazuo Otani, Kodaira; Kazuo Kashiwagi, Tokyo; Kamon Hasuo, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/901,132

[22] Filed: Jul. 28, 1997

Related U.S. Application Data

[63] Continuation of application No. 08/578,056, Dec. 22, 1995, abandoned, which is a continuation of application No. 08/138,087, Oct. 20, 1993, abandoned.

[30] Foreign Application Priority Data

Oct. 21, 1992 [JP] Japan ................. 4-283048

[51] Int. Cl.[7] .................................. G06F 15/16
[52] U.S. Cl. ............... 709/232; 709/217; 358/404
[58] Field of Search ............... 395/200.62, 200.47, 395/200.6; 358/434, 402, 404; 709/232, 217, 230

[56] References Cited

U.S. PATENT DOCUMENTS

| | | | |
|---|---|---|---|
| 4,809,214 | 2/1989 | Shimakura | 395/600 |
| 4,901,063 | 2/1990 | Kimura et al. | 340/723 |
| 5,020,123 | 5/1991 | Thompson | 382/61 |
| 5,084,769 | 1/1992 | Miura | 358/403 |
| 5,129,016 | 7/1992 | Murakami et al. | 382/61 |
| 5,237,430 | 8/1993 | Sakurai | 358/444 |

*Primary Examiner*—Zarni Maung
*Attorney, Agent, or Firm*—Fitzpatrick, Cella, Harper & Scinto

[57] ABSTRACT

After image data received from a facsimile on the transmission side through a public telephone circuit was stored into a disk, the image data is read out from the disk, index information is added to the image data, and the resultant data is preserved into an image file apparatus through an external interface, thereby enabling the image data received by a facsimile apparatus to be searched in the image file apparatus.

24 Claims, 18 Drawing Sheets

FIG. 8

AUGUST 4, (TUESDAY), 10:42

[5] DOCUMENTS

[ ]:UNDISPOSED  [*]:RESERVED  [?]:UNRESERVED

DOCUMENT MANAGEMENT FILE

| DELETION | IMAGE INDEX PATTERN | KEY WORD | KEY NO. | PREPARATION DATE | UPDATING DATE | TOTAL NUMBER OF PAGES | PAGE FILE POINTER |
|---|---|---|---|---|---|---|---|
| 1 | 100100········· | PARTS CATALOG | 337 | 91.05.02 | 92.01.08 | 3 | 1 |
| 1 | 100010········· | PARTS DRAWING | 150 | 92.02.05 | 92.03.20 | 2 | 4 |
| ·· | ·· | ·· | ·· | ·· | ·· | ·· | ·· |
| 1 | 010000········· | REPORT | 110 | 90.01.25 | 90.01.26 | 2 | 8 |
| 1 | 100010········· | PARTS DRAWING | 151 | 92.02.07 | 92.03.21 | 2 | 10 |
| ·· | ·· | ·· | ·· | ·· | ·· | ·· | ·· |

FIG. 16

PAGE MANAGEMENT FILE

| | DELETION | FRONT AND BACK MODE | OHTER IMAGE INFORMATION | node |
|---|---|---|---|---|
| 1 | 1 | ONE SIDE | ~ | 5 |
| 2 | 1 | ONE SIDE | ~ | 6 |
| 3 | 1 | ONE SIDE | ~ | 7 |
| 4 | 1 | BOTH SIDES | ~ | 12 |
| 5 | 1 | BOTH SIDES | ~ | 13 |
| :  | :  | :  | :  | :  |
| 8 | 1 | ONE SIDE | ~ | 1 |
| 9 | 0 | ONE SIDE | ~ | 2 |
| 10 | 0 | BOTH SIDES · FRONT | ~ | 20 |
| 11 | 1 | BOTH SIDES · BACK | ~ | 20 |
| :  | :  | :  | :  | :  |

FIG. 17 node TABLE

|    | DATA SIZE | FAT ENTRY |
|----|-----------|-----------|
| 1  | 87654     | 23B6      |
| 2  | 56789     | 3342      |
| ⋮  |           |           |
| 5  | 76543     | 5658      |
| 6  | 23599     | 56A0      |
| 7  | 98765     | 570C      |
| ⋮  |           |           |
| 12 | 89765     | 62B0      |
| 13 | 98752     | 632B      |
| ⋮  |           |           |
| 20 | 87875     | 5086      |

| CLUSTER NO. | PHYSICAL ADDRESS ||
|---|---|---|
| | TRACK NO. | SECTOR NO. |
| 0 | 0 | 1～8 |
| 1 | 0 | 9～16 |
| 2 | 1 | 1～8 |
| ⋮ | ⋮ | ⋮ |

METHOD AND APPARATUS FOR STORING RECEIVED DATA IN ASSOCIATION WITH CORRELATED INDEX INFORMATION

This application is a continuation of application Ser. No. 08/578,056 filed on Dec. 22, 1995, now abandoned which is a continuation of application Ser. No. 08/138,087 filed on Oct. 20, 1993 now abandoned.

BACKGROUND OF THE INVENTION

1. Field of the Invention

The invention relates to an image processing apparatus for storing a received image.

2. Related Background Art

There is a facsimile apparatus for preserving image data received via a facsimile to a hard disk without recording onto a paper.

Such a facsimile apparatus is used to save papers or to preserve the received image data to a medium other than the paper.

However, in such a facsimile apparatus, when the image data preserved in the hard disk is searched, there is a way nothing but the image data is searched by using the telephone number on the transmission side as a key word, so that it is difficult to search desired image data. In order to input the image data into a filing apparatus in which the image data can be easily searched, the image data preserved in the hard disk is once read out from the facsimile apparatus and is recorded onto the papers and the recording papers must be read into the filing apparatus, so that those operations are very troublesome.

SUMMARY OF THE INVENTION

It is an object of the invention to provide an image receiving apparatus which can solve the above problem.

Another object of the invention is to provide an image receiving apparatus which can improve a using efficiency of the user.

To accomplish the above objects, according to the invention, there is provided an image processing apparatus comprising: receiving means for receiving data; first and second memory means for storing the data; and processing means for processing a plurality of data in parallel, wherein while said processing means is processing one data, when the receiving means receives another data, the processing means continues the process of the data that is being processed and allows another data from the receiving means to be stored into the first memory means and, further, allows the another data stored in the first memory means to be stored into the second memory means.

According to the invention, there is also provided image processing apparatus comprising: receiving means for receiving data; first and second memory means for storing the data; control means for storing the data from the receiving means into the first memory means; and third memory means for storing additional information, wherein the control means adds the additional information stored in the third memory means to the data stored in the first memory means and allows the resultant data to be stored into the second memory means.

According to the invention, there is also provided an image processing apparatus comprising: receiving means for receiving data; first and second memory means for storing the data; instructing means for instructing so as to store the data stored in the first memory means into the second memory means; control means for executing a control in either one of a first mode in which after the data from the receiving means was stored into the first memory means, the data stored in the first memory means is stored into the second memory means irrespective of an instruction from the instructing means and a second mode in which after the data from the receiving means was stored into the first memory means, the data stored in the first memory means is stored into the second memory means in accordance with an instruction from the instructing means; and selecting means for selecting either one of the first and second modes.

According to the invention, there is provided an image processing apparatus comprising: receiving means for receiving data; first and second memory means for storing data; third memory means for storing a plurality of additional information; and control means for allowing the data from the receiving means to be stored into the first memory means, wherein the control means selects either one of a first mode in which the additional information selected before the receiving means receives the data from among the plurality of additional information stored in the third memory means is added to the data stored in the first memory means and the resultant data is stored into the second memory means and a second mode in which the additional information selected after the receiving means finished the data reception from among the plurality of additional information stored in the third memory means is added to the data stored in the first memory means and the resultant data is stored into the second memory means, and the control means subsequently executes a control in the selected mode.

The above and other objects and features of the present invention will become apparent from the following detailed description and the appended claims with reference to the accompanying drawings.

BRIEF DESCRIPTION OF THE DRAWINGS

FIG. 8 is a diagram showing the display of a history file;

FIG. 15 is a diagram showing the content of a document management file;

FIG. 16 is a diagram showing the content of a page management file;

FIG. 17 is a diagram showing the content of a node table;

DETAILED DESCRIPTION OF THE PREFERRED EMBODIMENT

Figure 1:
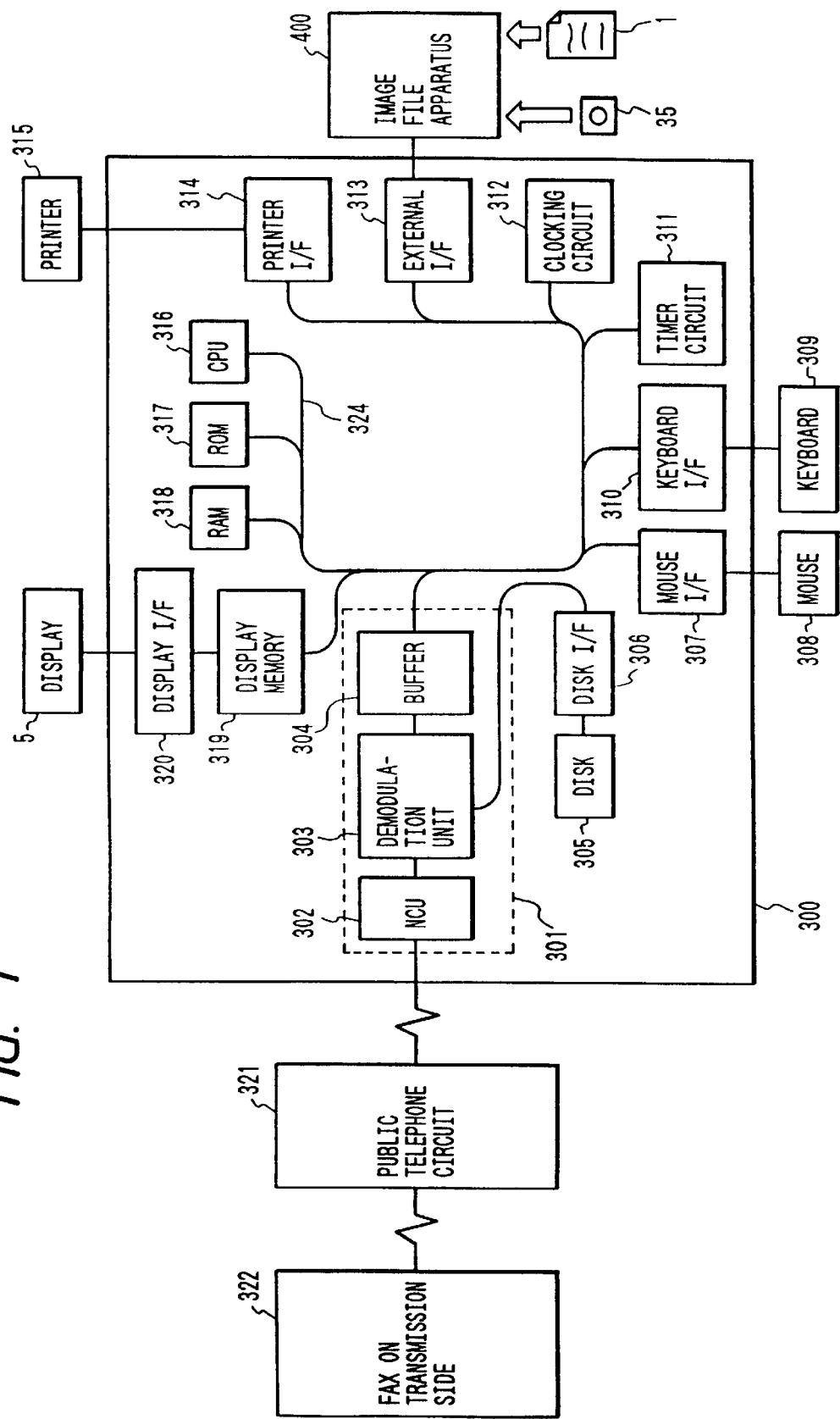
FIG. 1 is an internal constructional diagram of an image receiving apparatus.

FIG. 1 is an internal constructional diagram of an image receiving apparatus.

An image receiving apparatus 300 is controlled by executing a program stored in an ROM 317 by a CPU 316.

The following component elements are connected to a system bus 324: namely, an image reception unit 301 comprising a well-known NCU (Network Control Unit) 302, a well-known demodulation unit 303, and a buffer 304; a disk interface 306 as an interface to a magnetic disk 305; a mouse interface 307 to input from a mouse 308 as a well-known pointing device; a keyboard interface 310 connected to a keyboard 309; a timer circuit 311 to interrupt the CPU 316 at a predetermined period; a clocking circuit 312 to read out the time and date; a printer interface 314 as an interface to a printer 315 such as an LBP (Laser Beam Printer), a thermal printer, or the like; a display interface 320 as an interface to the display 5 such as a CRT, a liquid crystal display, or the like; a display memory 319 to store display information to the display 5; an external interface 313 as an interface to a communication interface 17 of an external image file apparatus 400; an RAM 318 into which a general program and data on the processing are stored; and the like.

The image file apparatus 400 is an apparatus for reading an image of an original 1 and storing image information to a medium such as a magnetooptic disk 35 or the like or searching the image information.

After the image data received from a facsimile apparatus 322 on the transmission side through a public telephone circuit 321 was stored to the disk 305, the image data is read out from the disk 305 and index information is added to the image data. After that, the resultant data is preserved into the image file apparatus 400 through the external interface 313.

Figure 9:
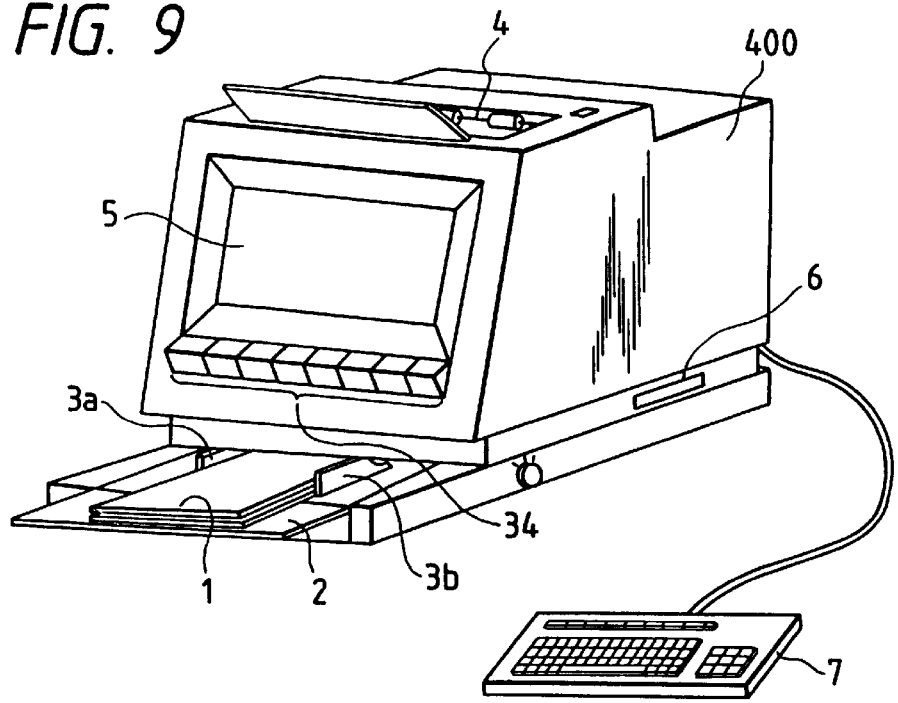
FIG. 9 is a schematic diagram of an image file apparatus 400.
Figure 10:
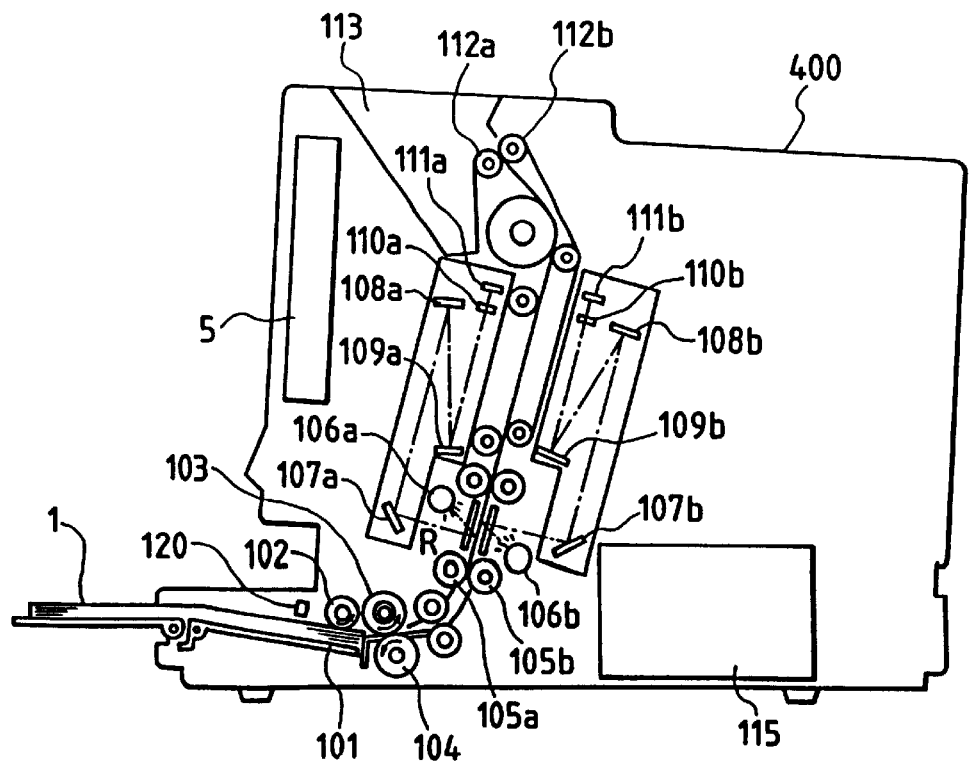
FIG. 10 is an internal perspective view of the image file apparatus 400.
Figure 11:
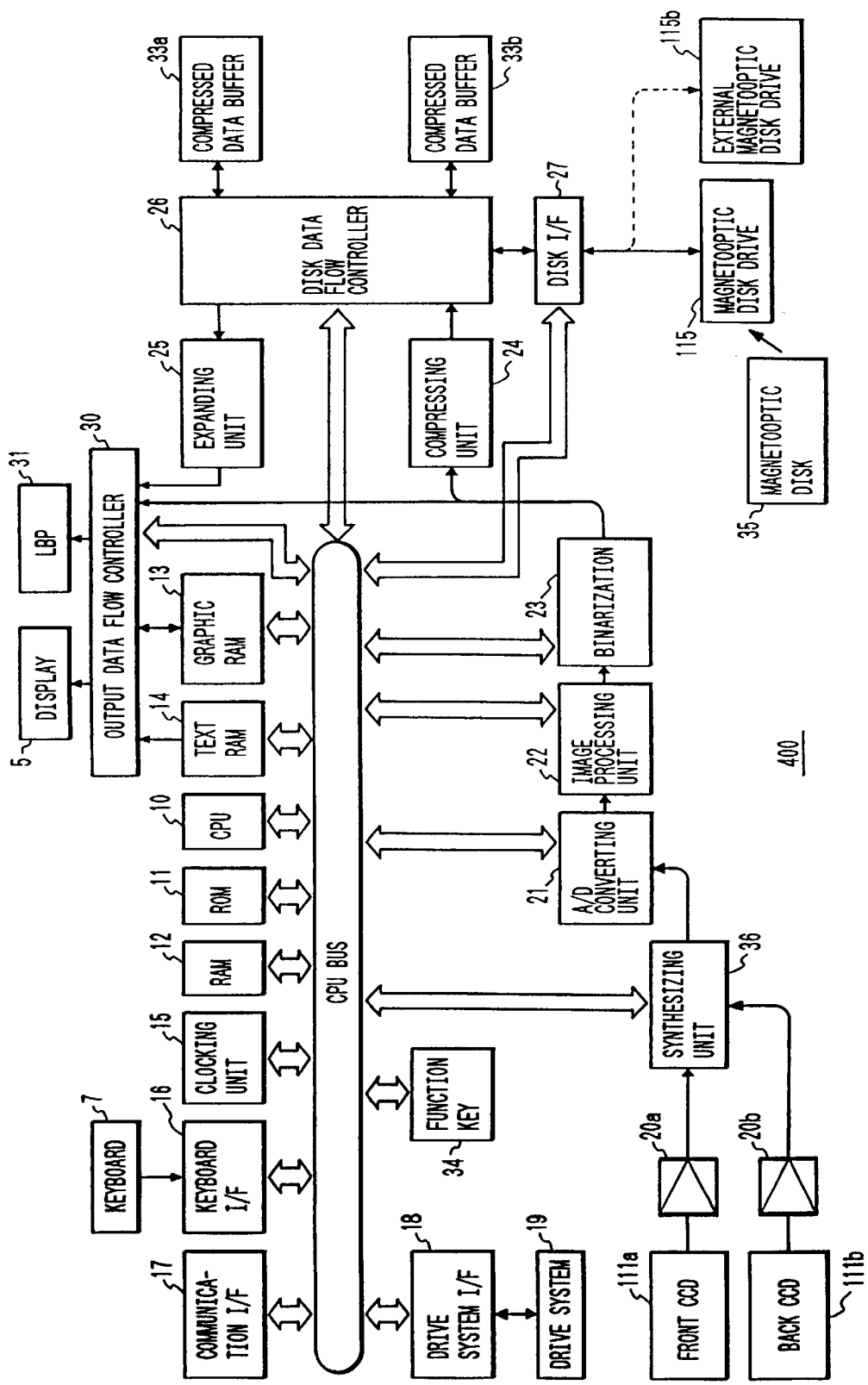
FIG. 11 is a block diagram of the image file apparatus 400.

FIG. 9 is an external view of the image file apparatus 400. FIG. 10 is an internal perspective view of the image file apparatus 400. FIG. 11 is a block constructional diagram of the image file apparatus 400.

In FIG. 9, reference numeral 1 denotes the original whose image which is set in order to record image information to the magnetooptic disk; 2 an original supporting plate; 3a and 3b restricting plates to restrict the conveyance of the original; 4 a paper delivery section; 5 a screen (display) to display image information, an operation instruction, or the like; 6 an inserting port to insert the magnetooptic disk; and 7 a keyboard to input a key word or the like via a keyboard interface 16 when an image is searched.

When image information is recorded, as shown in FIG. 9, the operator puts the original 1 onto the original supporting plate 2 and gives an instruction for the reading operation by the keyboard 7 or the like, so that the conveyance of the original is started.

First, a feed roller 102 shown in FIG. 10 rotates in the direction shown by an arrow and the original is fed to a separating section. The separating section comprises a paper feed roller 103 and a separating roller 104 and respectively rotate counterclockwise. The original (original locating at the top position) in the surface layer portion of the originals stacked is first fed. The originals other than the top original are remained by the interval between the paper feed roller 103 and the separating roller 104 and by a frictional force between the original and the separating roller 104.

The original 1 which was fed first is subsequently conveyed to a reading section R by conveying rollers 105a and 105b.

In the reading section R, the image of the original illuminated by an illuminating lamp 106 is reflected by mirrors 107 to 109 and is led to a lens 110 and is converged by the lens 110 and is read by a CCD 111 (the suffix a or b in each reference numeral is omitted here).

In FIG. 10, a section comprising the component elements 106a to 111a and a section comprising the component elements 106b to 111b have the same construction and can simultaneously read the images on both sides of one original.

The original which passed through the reading section R is stacked onto a paper delivery tray 113 by paper delivery rollers 112a and 112b.

The above series of operations are continuously executed and are continued until the absence of the original on an original supporting plate 101 is detected by an original sensor 120.

A drive system 19 shown in FIG. 11 comprises the original sensor 120 and motors (not shown) to drive the conveying rollers 102 to 105, 112, and the like. The above conveying operations are executed by controlling the drive system 19 by a CPU 10 through the drive system interface 18.

Image signals obtained by the CCD 111a for the front surface and the CCD 111b for the back surface are supplied to a synthesizing unit 36 through amplifiers 20a and 20b, respectively.

The synthesizing unit 36 has a function such that when the data of one main scan is supplied from the CCD 111a for the front side to the next stage, an internal switching device is switched and the image data of one main scan is subsequently supplied from the CCD 111b for the back side to the next stage.

The image data on the front and back sides are converted into the serial data on a main scan unit basis and sent to a compression unit at the next stage.

The above operations have been described with respect to the reading mode of two sides. In the case where the reading mode of one side is designated, the above switching operation is not performed but the image data is always sent from the CCD 111a for the front side to the next stage.

After the image signal from the synthesizing unit 36 was quantized by an A/D converting unit 21, an image process such as an edge emphasis or the like is executed by an image processing unit 22 and is converted into the binary image data of 1/0 by a binarization unit 23.

The binary image data is stored into a graphic RAM 13 and is subjected to a well-known image information compression based on the MH, MR, MMR, or the like by a compressing unit 24. After that, the compressed image data is stored into either one of data buffers 33a and 33b.

The graphic RAM 13 is constructed in a manner such that the data to be stored is drawn on the display 5 by an output data flow controller 30. The binary image data stored in the graphic RAM 13 as mentioned above is displayed on the display 5. A text RAM 14 is a memory for storing character and the like as character data to be displayed. The character data is displayed on the display 5. An ROM 11 is a memory into which a control program is stored. An RAM 12 is a memory into which a general program and data on the processing are stored.

The compressed image data stored in the compressed data buffer 33a or 33b is sent to a magnetooptic disk drive 115 through a disk interface 27 and written to a magnetooptic disk 35.

The reason why there are two compressed data buffers 33a and 33b is because, for example, even while the compressed image data in the compressed data buffer 33a is being written to the magnetooptic disk 35, the next original is scanned and its compressed image data is stored into the compressed data buffer 33b.

Consequently, the restriction such that until the writing operation of the image data of the preceding original into the magnetooptic disk 35 is finished, the apparatus must wait for the scan of the next original is avoided. A recording speed of the original is improved.

The operation in case of displaying the recorded image will now be described.

After the desired compressed image data on the magnetooptic disk was specified in accordance with a procedure, which will be explained hereinlater, the CPU 10 controls the disk interface 27, so that the compressed image data is read out by the magnetooptic disk drive 115.

In this instance, the apparatus is in a state in which it functions in a manner such that a disk data flow controller 26 sends the compressed image data from the disk interface 27 to an expanding unit 25 under the control of the CPU 10.

In this instance, the CPU 10 gives an instruction to an output data flow controller 30 so as to store the image data from the expanding unit 25 into the graphic RAM 13 and to display the image data in the graphic RAM 13 onto the display 5 in a manner similar to the case of recording of the image.

The compressed image data recorded on the magnetooptic disk 35 is displayed as mentioned above.

When the image is printed, in a state in which the image is displayed on the display 5 as mentioned above, the CPU 10 gives an instruction to the output data flow controller 30 so as to send the image data in the graphic RAM 13 to an LBP 31.

As a display 5, a well-known liquid crystal display or a CRT (cathode ray tube) or the like can be used. As an LBP, it is possible to use a well-known laser beam printer such that a toner is deposited onto a photosensitive drum by irradiating a laser beam to the photosensitive drum and the toner is transferred onto the paper, thereby obtaining a print.

The internal operation regarding the recording and search of the image will now be described.

First, prior to actually recording the original image, a symbolic image called an index image to search the original to be recorded in future are previously recorded onto the magnetooptic disk 35.

Figure 12:
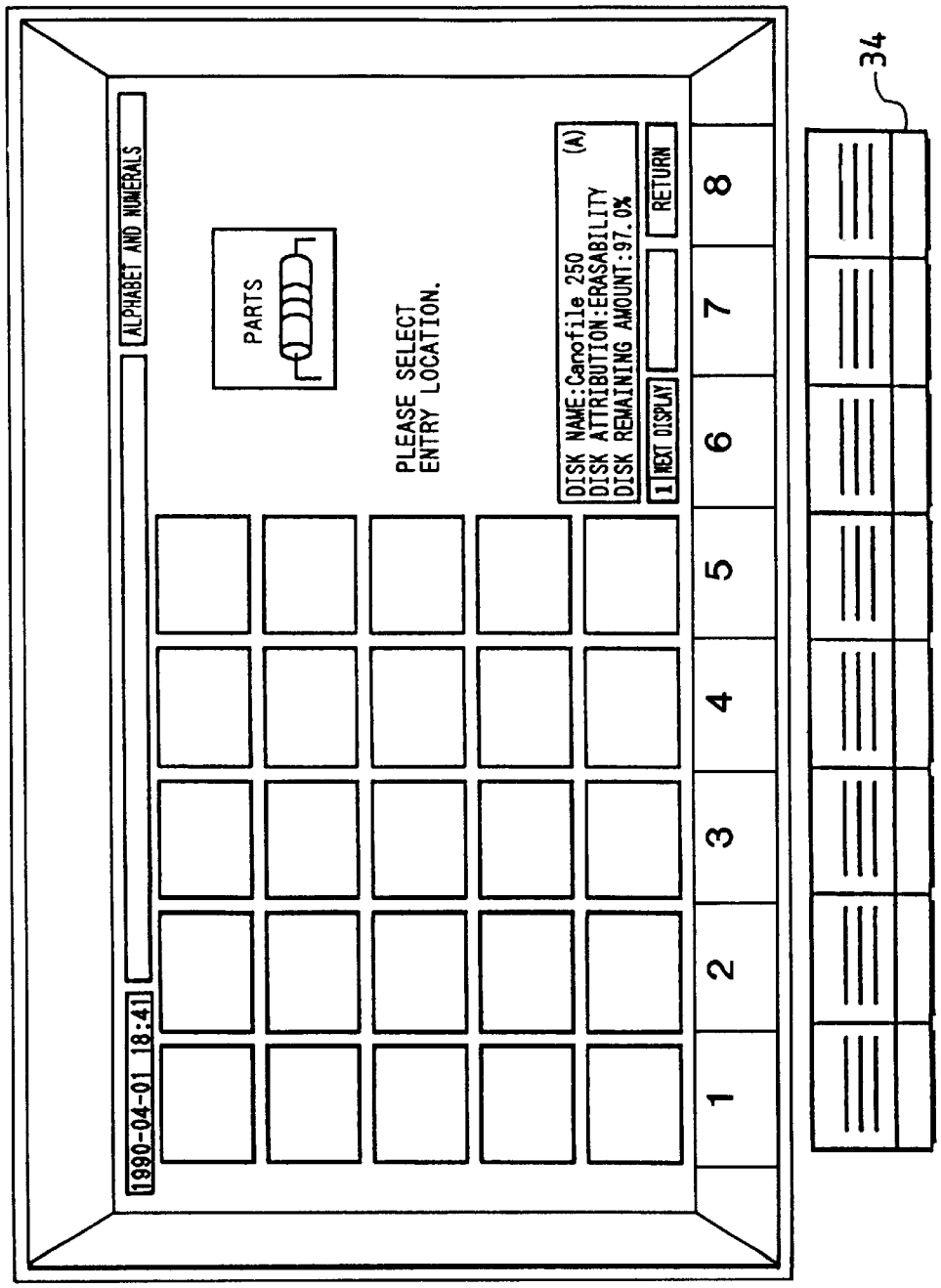
FIG. 12 is a diagram showing a display image upon registration of an index.

The above recording operation is executed in a manner similar to the recording of the original image mentioned above. An instruction such that the index image including a character image of, for example, "PARTS" in FIG. 12 is subsequently displayed at the left upper position is designated by using function keys 34 arranged in a line in the lateral direction each time one index image is recorded.

For example, by depressing the leftmost function key (key locating below a character "1") twice, the second position from the leftmost top position can be designated.

Figure 14:
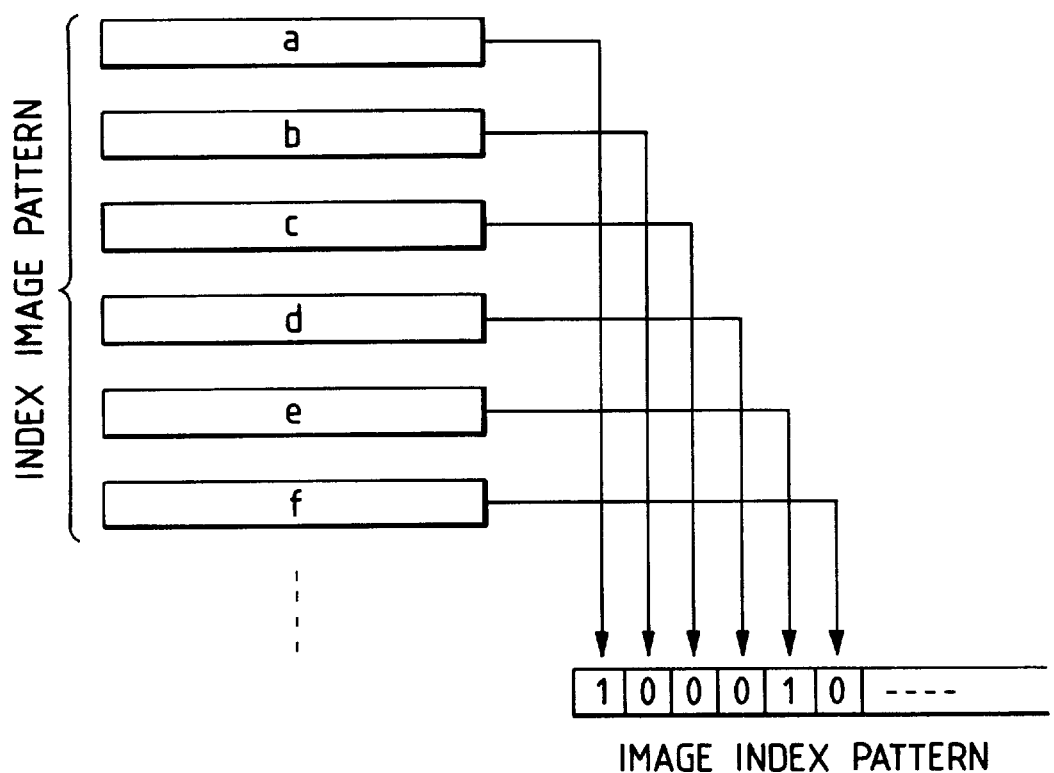
FIG. 14 is a diagram showing an index image data file.

When a plurality of index images are recorded as mentioned above, an index image data file is generated on the magnetooptic disk 35 as shown in FIG. 14.

Figure 13:
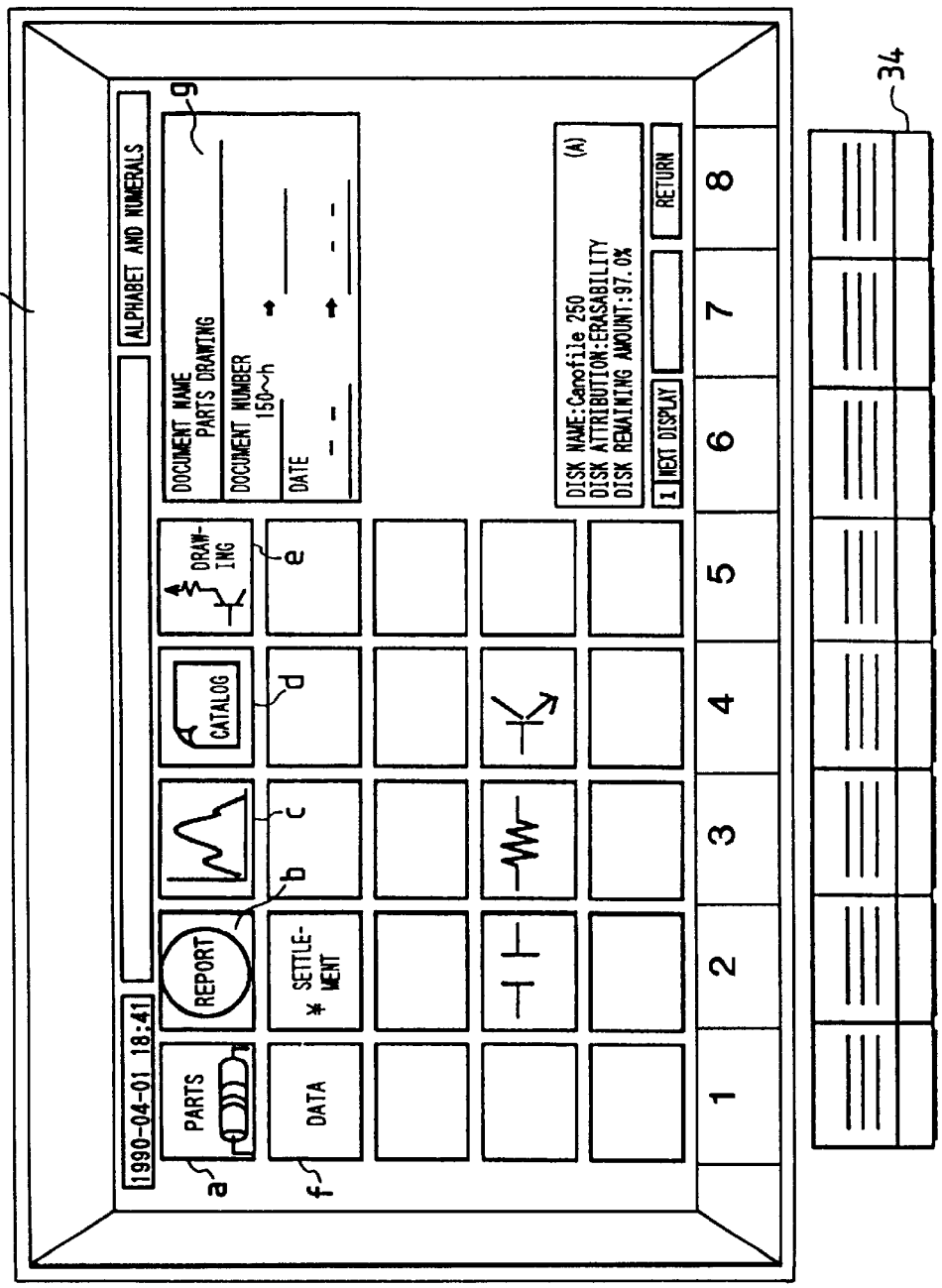
FIG. 13 is a diagram showing a display image upon index search.

When the original image is recorded, an image is first displayed as shown in FIG. 13 prior to actually recording the original.

The operator selects the index image to search the original to be recorded from now on by using the function keys 34.

For example, in case of recording the original of a parts drawing, it is sufficient to select the index images of (a) and (e).

By selecting the index images (a) and (e), an image index pattern in which "1" is set to the bit positions corresponding to the selected index images are produced as shown in FIG. 14.

Or, a key word or a key No. to search the original to be recorded from now on can be also inputted to the columns of (g) and (h) in FIG. 13 by the keyboard 7.

After the index image, key word, or key No. as mentioned above was inputted, the foregoing recording operation of the original is executed.

At a time point of the end of the recording of the original, the data to search the original existing on the magnetooptic disk 35 and recorded in a document management file shown in FIG. 15 has been produced.

For instance, in case of the example of "PARTS DRAWING" mentioned above, a record including "100010 . . . " indicative of the image index pattern, "PARTS DRAWING" indicative of the key word, "150" indicative of the key No., and the like is produced at the second stage in FIG. 15.

In addition to them, the time and date of the formation of such a record (recording time and date), the total number of pages, and the like obtained by a clocking unit 15 in FIG. 11 are written.

The information regarding each page of the recorded original is written in a page management file in FIG. 16. "PAGE FILE POINTER" in a document management file in FIG. 15 denotes that which number of record in the page management file in FIG. 16 relates to the first page of the original recorded at that time.

The front/back mode, namely, information regarding whether the page has been read in the both-side mode or one-side mode as mentioned above is also recorded in the page management file.

In the above example, the position on the disk of the image data on the magnetooptic disk 35, that is, the foregoing compressed image data is managed by allowing a data table called a node table shown in FIG. 17 to be held on the magnetooptic disk 35.

An FAT entry in the node table in FIG. 17 will be described hereinbelow.

Figures 18, 19:
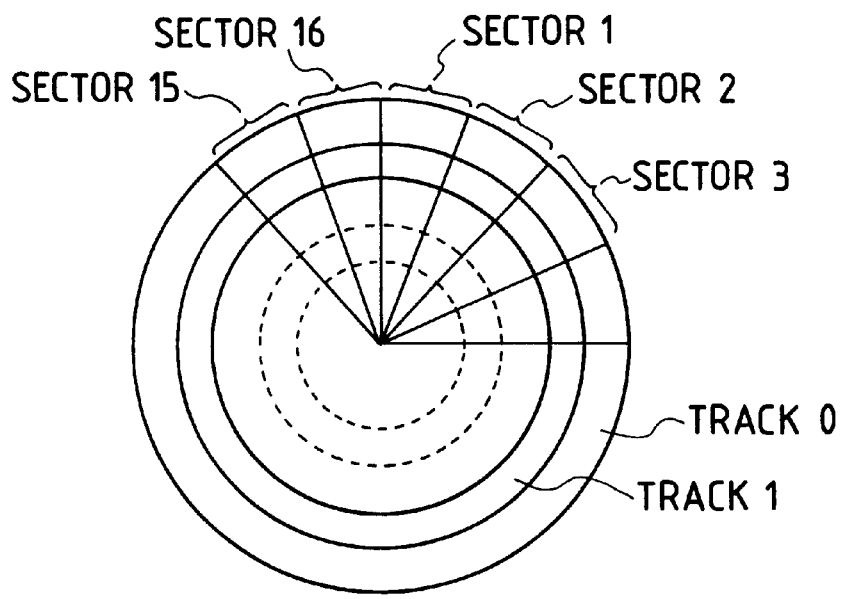
FIG. 18 is a diagram showing a memory area in a medium of a magnetooptic disk 35.
FIG. 19 is a diagram showing the correspondence between a logical address and a physical address.

FIG. 18 is a diagram showing a storage area in the medium of the magnetooptic disk 35.

As is well known, a memory area of such a disk is divided by physical segments called tracks and sectors. Such a physical segment is hereinafter called a physical address.

The magnetooptic disk drive 115 in FIG. 11 accesses the area on the magnetooptic disk 35 into/from which information is stored or read out on the basis of the physical address designated from the outside of the disk drive 115. On the other hand, in the CPU, the area is managed by a logical area segment called a well-known cluster. The position information of the logical area segment is hereinafter called a logical address.

In such a system, the correspondence between the logical address and the physical address has unconditionally been determined as shown in an example of FIG. 19. The determination of the logical address is equivalent to the determination of the physical address.

A management table indicative of "UNUSED"/"USED"/"ERASED" of the area that is designated by the logical address has been stored on the specified physical address in the medium.

In the example, in the case where the cluster is unused, FFFF is written. In the case where the cluster was erased, FFFE is written. In the case where the cluster is a final cluster of the file, 0000 is written. Further, in the case where there is a cluster which continues to the cluster, the logical address of the continuous cluster is written.

There is the following difference between "ERASED" and "UNUSED". "UNUSED" denotes a state in which no meaning information exists at a position designated by the logical address. "ERASED" denotes a state in which after the file was erased, information appears, namely, a state in which the information still exists at the position designated by the logical address.

Figure 20:
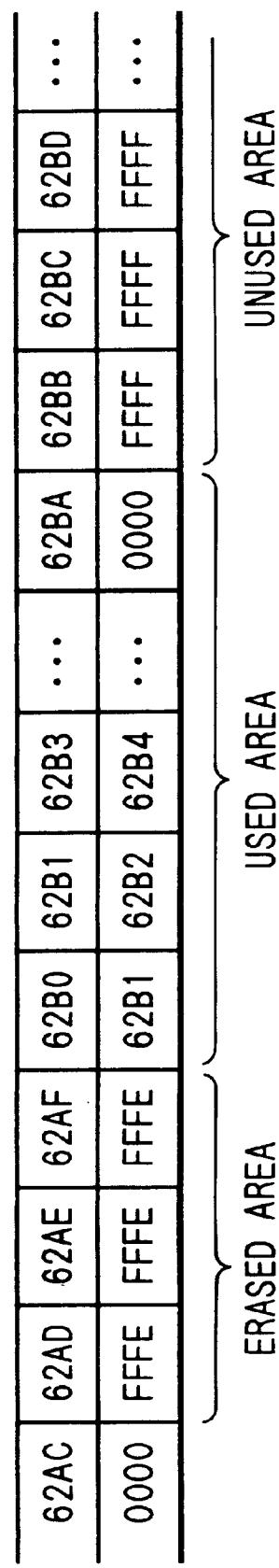
FIG. 20 is a diagram showing an address management table.

Such a management table is ordinarily called an FAT (File Allocation Table) or the like and is shown in FIG. 20.

The upper stage in FIG. 20 shows the logical addresses. Information indicating that the logical address shows "UNUSED" or "USED" or "ERASED" is written in the lower stage.

FIG. 20 shows a state in which the logical addresses 62B0 to 62BA have been used and the logical address 62BB and subsequent logical addresses are unused.

The logical addresses 62AD to 62AF show that although such a portion had been a part of the effective file, it was erased later.

The foregoing node table is a table in which the FAT entry (62B0 in the above example) indicating which position in the FAT relates to the compressed image file of the page and the size (the number of bytes) of the compressed image data are set into one record. An amount indicative of which number of record in the node table is called "node" and is written every page in the page management file in FIG. 16 mentioned above.

As mentioned above, the compressed image data is written to the magnetooptic disk 35 and the record is added to each of the node table, page management file, and document management file, so that the recording operation of the original is finished.

The internal operation upon searching of the image will now be described.

In the searching, an image as shown in FIG. 13 is displayed on the display 5 and the operator selects the image index by using the function key 34. Or, the operator inputs the key word or key No. by the keyboard 7 into the areas of (g) and (h) in FIG. 13.

The CPU 10 subsequently examines the document management file one record by one and selects the record which coincides with the image index pattern, key word, or key No. which was selected or inputted.

Now, assuming that the selected index image is, for instance, only the index image of (a) including the character image of "PARTS" in FIG. 13, the image index including the character image of "DRAWING" is not selected, so that the image index pattern differs from that in FIG. 14 and the bit corresponding to (e) is equal to 0.

When the record in the document management file in FIG. 15 is examined, however, all of the records having the image index patterns in which "1" has been set to the same position as the bit position at which "1" had been set in the image index pattern inputted upon searching are selected. Therefore, in the above example, the top item "PARTS CATALOG", the second item "PARTS DRAWING", and the fourth item "PARTS DRAWING" in FIG. 15 are selected.

When "150" has already been inputted as a key No., only the second item "PARTS DRAWING" is obviously selected.

When "PARTS DRAWING" has been inputted as a key word, the second item "PARTS DRAWING" and the fourth item "PARTS DRAWING" are selected.

In the case where a plurality of originals were searched, the operator again selects either one of them by using the keyboard 7 as mentioned above.

When one original is finally selected, on the basis of the page management file in FIG. 16, the record of the first page of the original is selected by the page file pointer of the record and, further, the node is designated, so that the FAT entry of the first page is obtained from the node table.

By tracing the FAT in FIG. 20, accordingly, the logical address train is obtained, the compressed image data on the magnetooptic disk 35 is sequentially read out from the disk drive 115, and the image of the first page is displayed on the display 5 along the path of the data mentioned above.

The erasing operation of the recorded image information will now be described.

First, after the image was searched as mentioned above, in case of erasing the image, such a request is instructed to the CPU 10 by the keyboard 7.

Thus, "0" is recorded in the term of "DELETION" in which "1" has been stored so far in the document management file in FIG. 15.

Similarly, "0" is also written to the item of "DELETION" in the page management file in FIG. 16.

Further, by tracing the node, the FAT corresponding to the cluster constructing each page included in the original image is rewritten from the "USED" state so far (namely, since the logical address of the next cluster has been written) to the "ERASED" state.

As mentioned above, since the very large image data as an information amount itself is not rewritten in the erasure, its operation is promptly finished.

The condensing operation will now be described.

As will be obviously understood from FIG. 20, in the recording operation of the image, the writing operation of the compressed image data is executed for the cluster having the continuous logical addresses in order to perform the recording operation at a high speed.

By continuing the recording operation, a state in which the unused cluster train having the continuous logical addresses have completely been used is obtained. As mentiond above, however, since there is a possibility such that the erasing operation has been performed, by shortening the clusters in the erased state, for instance, the portions of 62AD to 62AF in case of the example of FIG. 20, the continuous logical addresses are newly obtained.

Such a "shortening" operation is called a "condense".

For example, as for the FAT, in case of FIG. 20, the condensing operation is executed by moving the areas 62B0 to 62BA to the areas starting from 62AD and by shortening the clusters in the erasing state existing in 62AD to 62AF.

Consequently, the unused areas on the right side are enlarged in the left direction by only the amount of such a movement in case of the example of FIG. 20.

Upon movement of the clusters, the FAT entries in the node table in FIG. 17 are also rewritten to those after completion of the movement.

With respect to the document management file in FIG. 15 and the page management file in FIG. 16, the records in which the item of "DELETION" is set to "0" are shortened and the page file pointers are also written to the pointers according to the page management file after the records were shortened.

The condensing operation is executed as mentioned above.

The image receiving apparatus 300 is not used only for the image reception but is also used for other objects. Therefore, the image receiving apparatus is constructed in a manner such that even in another arbitrary operation, for example, even in the case where an image is arbitrarily received during the execution of a calculating process or the like, while the calculating process or the like is continued, the received image information can be stored to the magnetic disk 305 in the image receiving apparatus 300 or to the image file apparatus 400 connected to the outside via the external interface 313.

Figure 7:
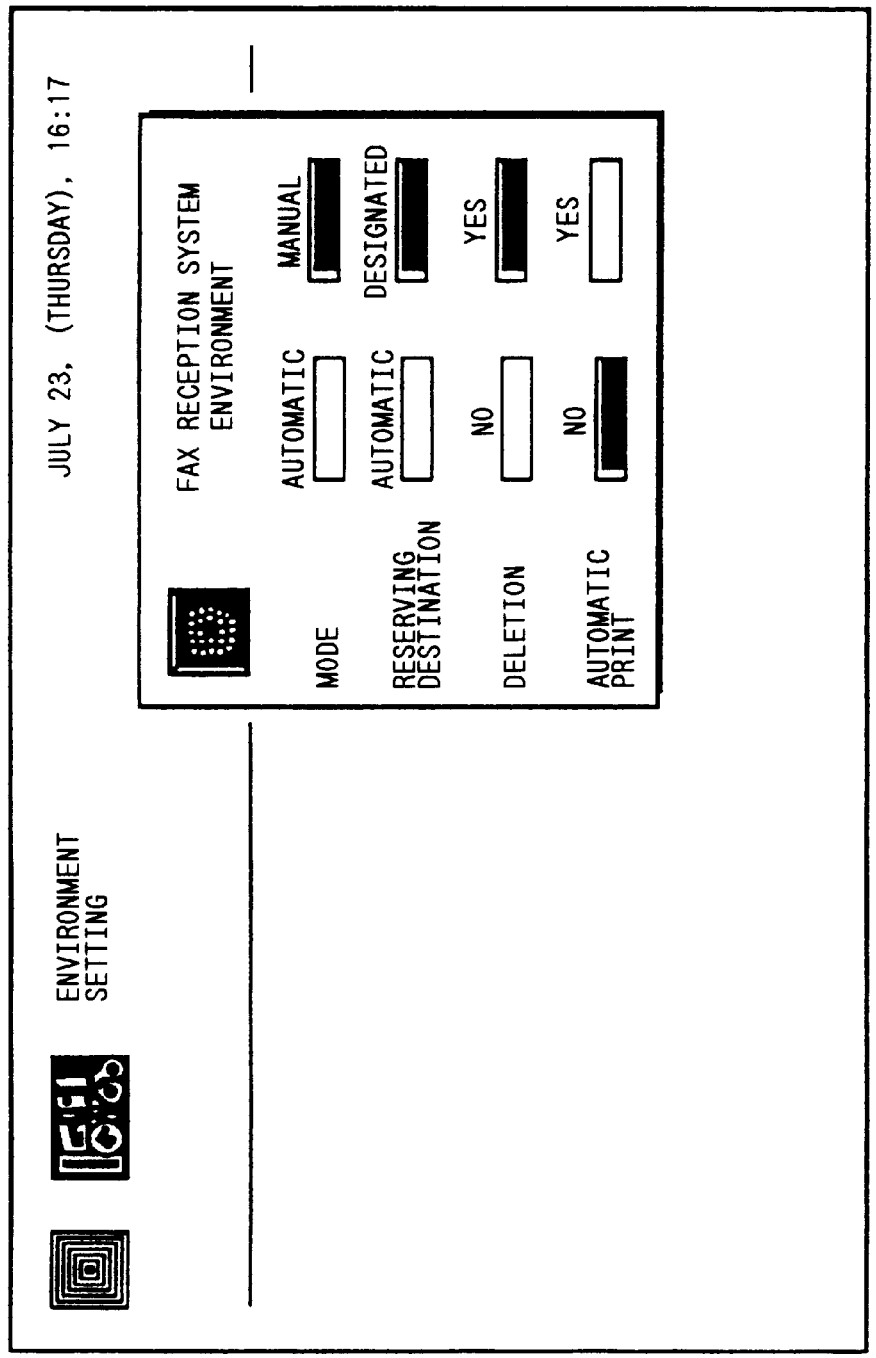
FIG. 7 is a diagram showing the screen to select a processing mode.

FIG. 7 shows the screen to preset a processing mode when an image is received during the execution of another arbitrary operation.

The operator can set a mode, a preserving destination side, a deleting mode, an automatic print mode, or the like by using the mouse 308.

A program to perform such a setting operation has been stored in the ROM 317 and is executed by the CPU 316 before the execution of another arbitrary program such as a calculating process or the like or the reception of an image.

The operation when an image is received in accordance with the mode set on the screen is executed as follows.

Mode: AUTOMATIC

When an image is received, even during the execution of another program, a process to store the image information to the image file apparatus 400 connected to the outside via the external interface 313 is executed.

Mode: MANUAL

When an image is received, the image information is stored to the disk 305 in the image receiving apparatus 300.

Preserving destination: AUTOMATIC

When the image information is stored into the image file apparatus 400, the index image to search the image has been predetermined in the image file apparatus 400 mentioned above and the determined index image is added to the image information and the resultant data is stored into the image file apparatus 400.

Preserving destination: DESIGNATED

When the image information is stored into the image file apparatus 400, the index image to search the image in the image file apparatus mentioned above is determined by the selecting operation of the operator each time and the determined index image is added to the image information and the resultant data is stored into the image file apparatus 400.

Deletion: YES

Just after the image information was stored into the image file apparatus 400, the image information in the disk 305 of the image receiving apparatus 300 on the transfer side is deleted.

Deletion: NO

Even after the image information was stored into the image file apparatus 400, the image information in the disk 305 of the image receiving apparatus 300 on the transfer side is preserved.

Automatic print: YES

When an image is received, the image is supplied to the printer 315.

Automatic print: NO

Even when an image is received, the image is not supplied to the printer 315.

The above results of the selections are stored as a set file into the disk 305.

The image signal which was subjected to a well-known modulation and was transmitted by the well-known facsimile apparatus 322 is transmitted through the well-known public telephone network 321 to the image reception unit 301 of the image receiving apparatus 300. In the image reception unit 301, the transmitted image signal is supplied from the well-known NCU (Network Control Unit) 302 to the well-known demodulation unit 303, so that the binary signal is obtained and written into the buffer 304.

The CPU 316 executes the program stored in the ROM 317 by a multitask method.

An outline of the multitask method will now be described.

Figure 2:
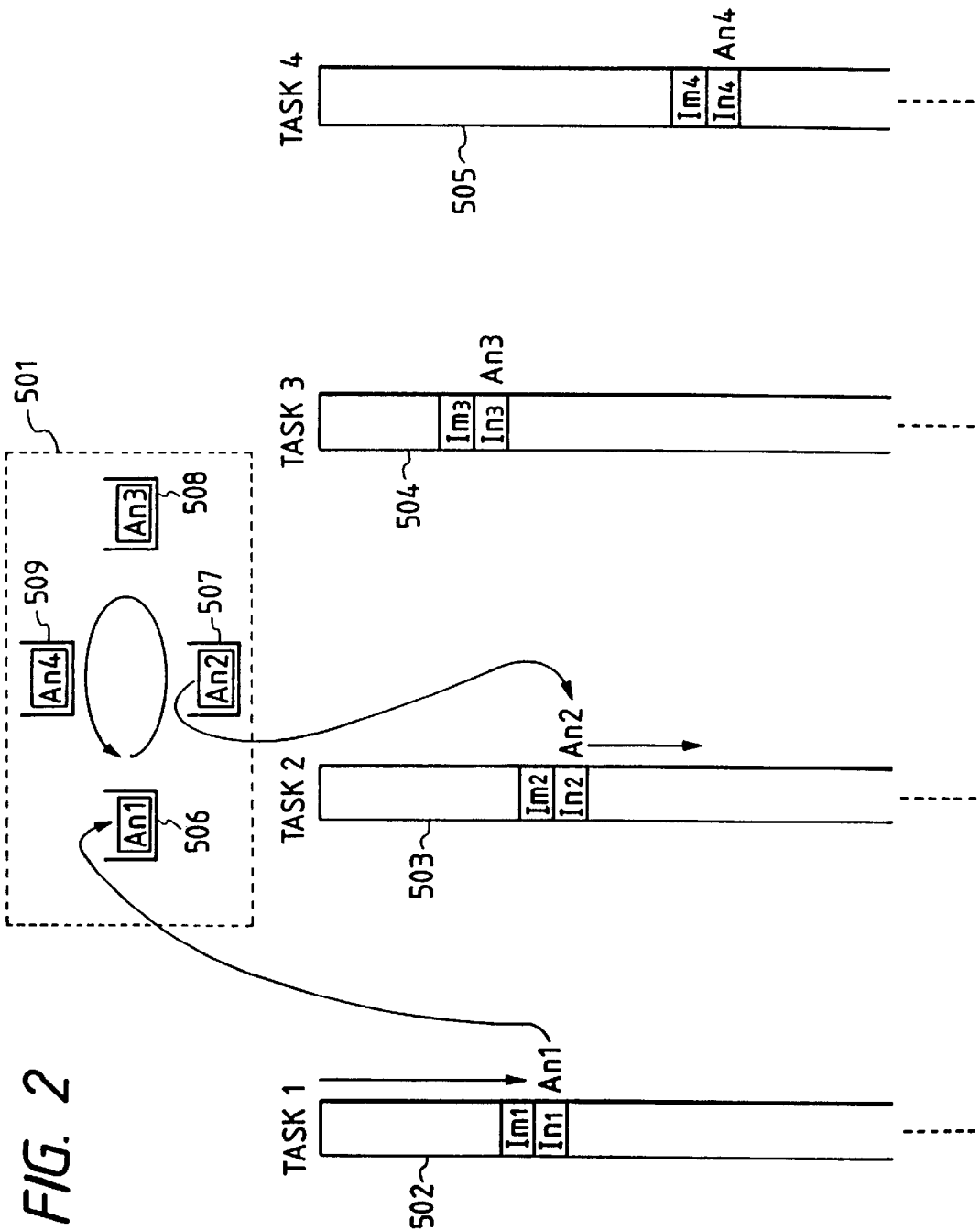
FIG. 2 is a diagram for explaining an outline of a multitask operation.
Figure 3:
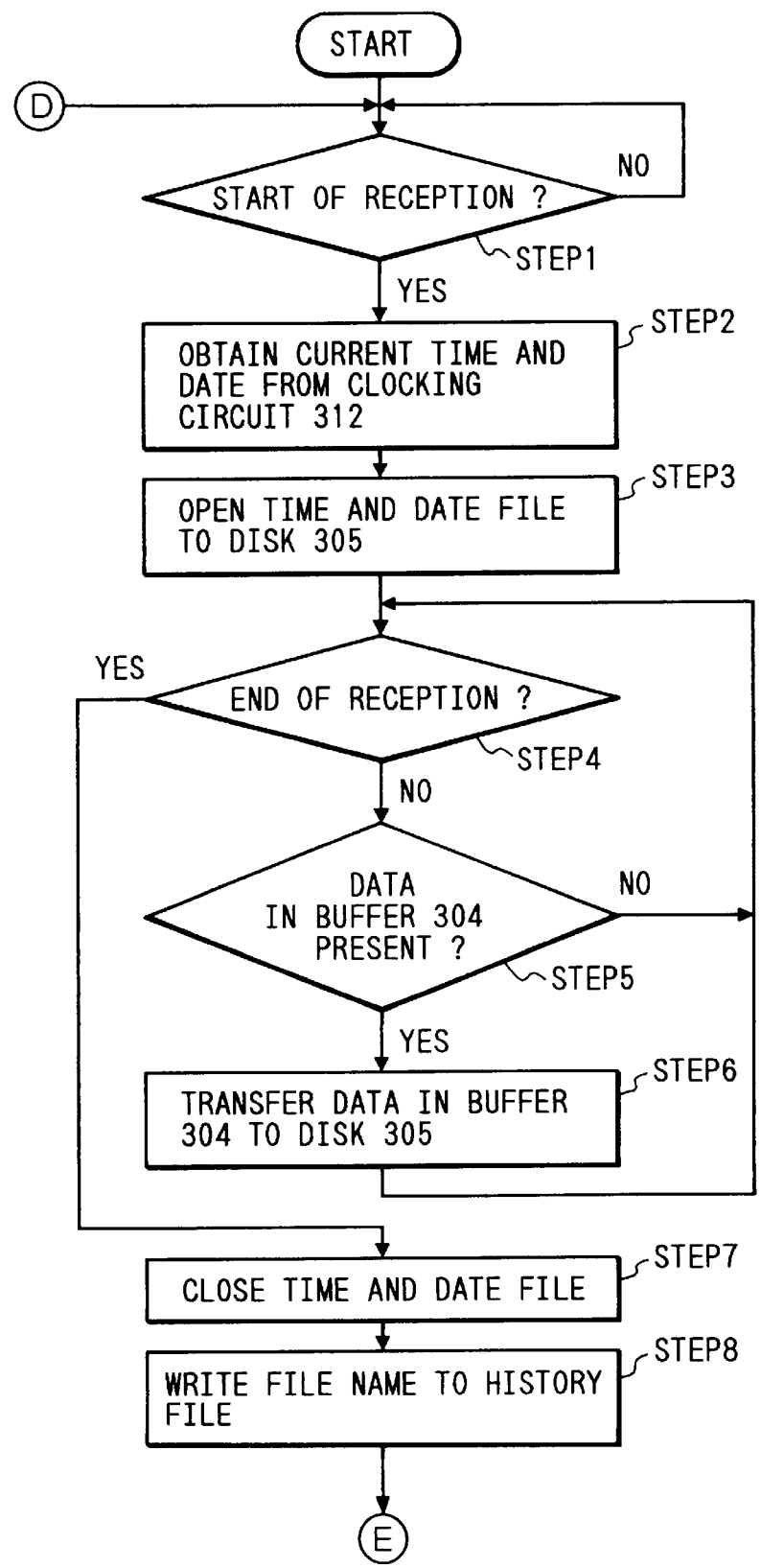
FIG. 3 is a flowchart for control of a background task.
Figure 4:
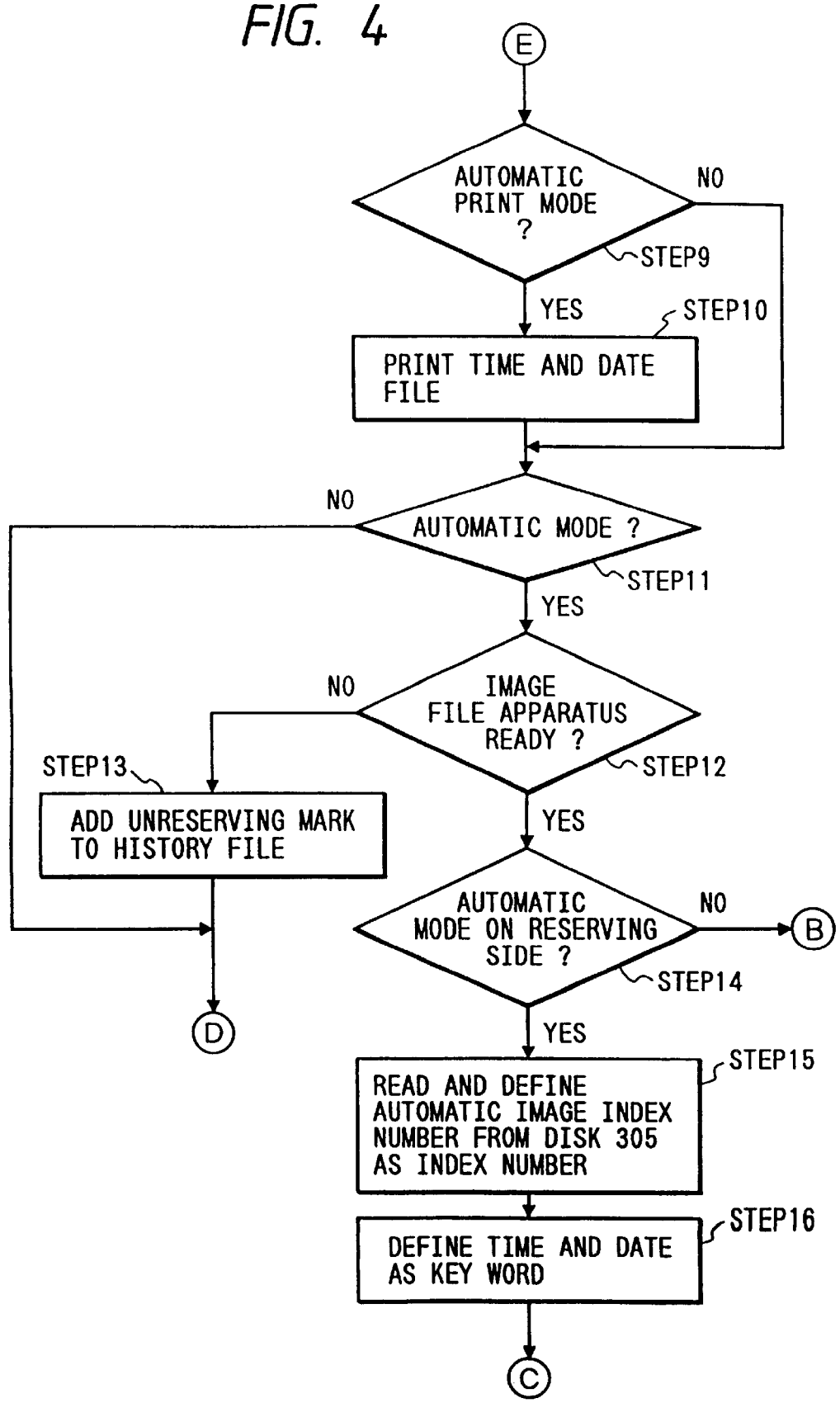
FIG. 4 is a flowchart for control of a background task.
Figure 5:
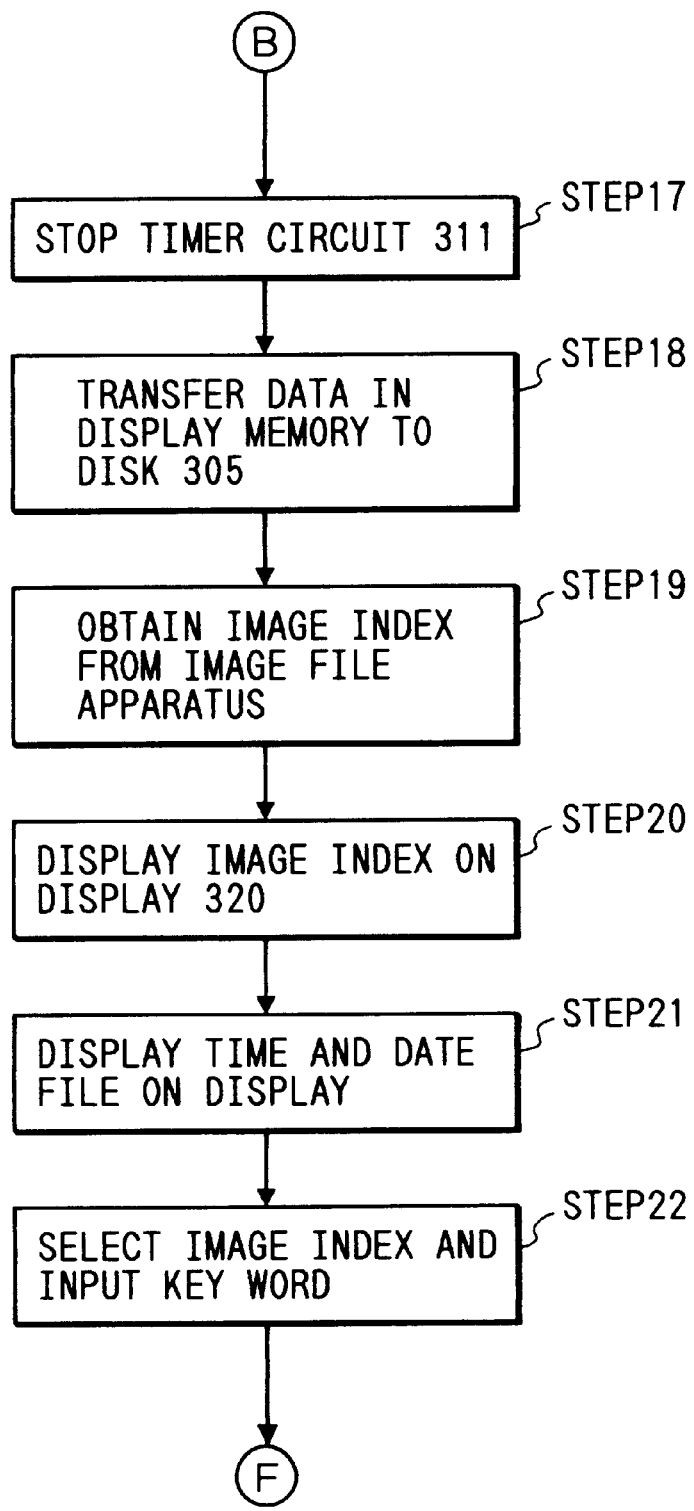
FIG. 5 is a flowchart for control of a background task.
Figure 6:
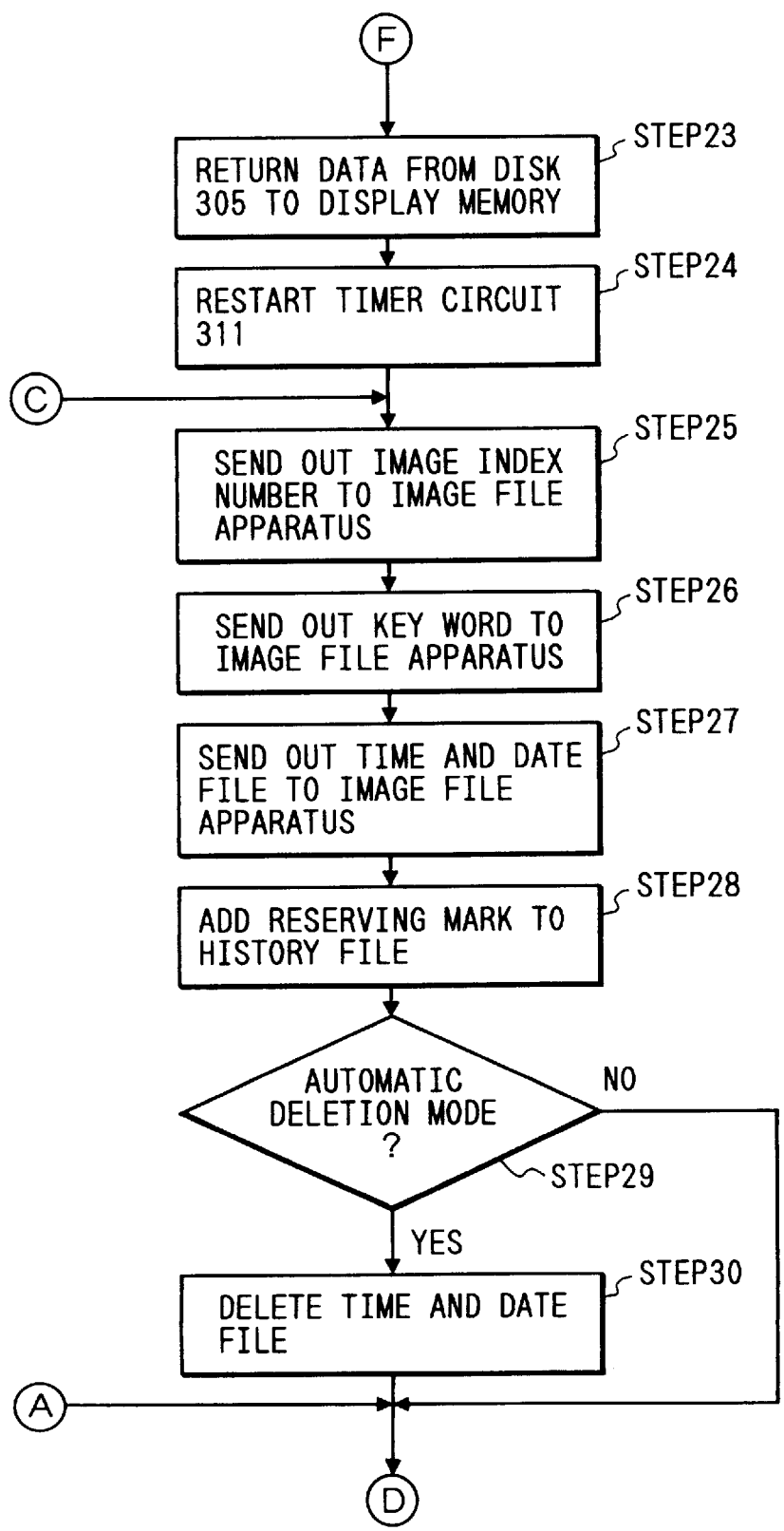
FIG. 6 is a flowchart for control of a background task.

FIG. 2 is a diagram for explaining the outline of the multitask operation.

The multitask method is a method of executing the time-divisional operations to a plurality of programs on a microtime unit basis, thereby falsely performing the operations in parallel.

The program in the multitask method is mainly constructed by an interruption processing section and a plurality of task programs.

FIG. 2 shows an example of the case where the task program allows four tasks (1) to (4) to be operated in parallel. Reference numeral 501 denotes an interruption processing section and 502 to 505 denote task programs.

The timer circuit 311 in FIG. 1 is a well-known timer circuit for generating a pulse waveform every microtime (5 msec is used in the present embodiment) mentioned above. The pulse signal is given to the CPU 316 as an interruption signal which is included in the system bus 324 in FIG. 1. Therefore, the CPU 316 executes the interruption processing program every 5 msec.

In FIG. 2, it is now assumed that the program of the task 1 is executed and, at a time point of the end of the execution up to a command $I_{m1}$, an interruption signal from the timer circuit 311 is given to the CPU 316. The CPU 316 executes the well-known interrupting operation and its control is shifted from the task 1 to the interruption processing section. In the interruption processing section, an address $A_{n1}$ of a command $I_{n1}$ to be subsequently executed by the task 1 is preserved into an entry address storing area 506 for the task 1. An address $A_{n2}$ which has previously been stored in an entry address storing area 507 for the task 2 by the operation similar to the preceding time, that is, the address $A_{n2}$ of the next command $I_{n2}$ of a command $I_{m2}$ which was finished precedingly in the task 2 is taken out and the process is jumped to the address $A_{n2}$.

The similar processes are repeated and in case of the interruption which occurs during the execution of the task 4, the entry address $A_{n1}$ for the task 1 which has already been preserved before is taken out and the execution of the task program is started from the command $I_{n1}$ of the task 1.

By the above method, the time-divisional operations are executed to a plurality of task programs on a microtime unit basis, so that the task programs are falsely operated in parallel.

By the above multitask method, in the apparatus, for example, the program for automatic image reception corresponds to the task 2 in FIG. 2. Therefore, for instance, even when the program such as calculating process, word processing, or the like is being executed by the task 1 in FIG. 2, the image information can be automatically received.

The task 2 is, hereinafter, referred to as a background task for automatic image reception and the task 1 is referred to as an arbitrary foreground task.

FIGS. 3, 4, 5, and 6 are flowcharts showing the program of the background task which is executed by the CPU 316.

In step 1, the apparatus waits for the start of the image reception by checking the demodulation unit 303 connected to the system bus 324. When the start of the image reception is detected in step 1, step 2 follows and the current time and data are obtained by reading the clocking circuit 312. In step 3, a file in which the current time and date are set to a file name (hereinafter, such a file is called a "time and data file") is opened in the disk 305. In step 4, a check is made to see if the image reception has been finished or not by examining the demodulation unit 303. When the reception is continued, a check is made in step 5 to see if the image data generated from the demodulation unit 303 exists in the buffer 304 or not. If YES, in step 6, the image data is added into the time and data file.

Although the demodulation unit 303 sequentially writes the received data into the buffer 304, since the data in the buffer 304 is sequentially transferred to the time and date file, the buffer 304 does not need a large memory size.

After completion of the image reception as mentioned above, the processing routine advances from step 4 to step 7 and the time and date file is closed.

In step 8, a history file is formed on the disk 305 and the file name of the time and date file is written as a reception history into the history file. In step 9, by examining the foregoing set file, a check is made to see if the automatic print mode has been set to "YES" or not. If YES, in step 10, the image data of the time and date file is supplied to the printer 315. In this instance, the image data is expanded from the well-known MH or MR compressed image data as a format of the received image information and the image is outputted to the printer 315 in a visible format.

By checking the set file in step 11, if the automatic mode has been set, step 12 follows. However, when the manual mode has been set, the processing routine is returned to step 1 and the apparatus prepares for the next reception. In case of the manual mode, nothing is written into the area to store the information indicating whether the history file has already been preserved or not. Due to this, as will be explained hereinlater, on the basis of the history file displayed on the display 5, whether the file has been preserved in the image file apparatus 400 or not can be known.

In step 12, a check is made to see if the image file apparatus 400 can store the image via the external interface 313 or not, that is, whether the power source has been turned on and the magnetooptic disk 35 has been set or not or the like. When the image cannot be stored, a mark [?] indicative of "unpreserved" is written into the history file in step 13. The processing routine is returned to step 1. When the image file apparatus 400 can store the image, in step 14, the set file is checked to see if the preserving destination side has been set into the automatic mode or not. When it has been set into the automatic mode, the automatic image index number which has previously been selected is read out from the set file and is set into the image index No. that is transmitted to the image file apparatus 400 at present. In step 16, the time and date used in the time and date file are set to a key word that is transmitted to the image file apparatus 400 at present. The processing routine advances to step 25.

In step 14, in the case where the preserving desgination side has been set to the designated mode, step 17 follows and the timer circuit 311 is stopped. Therefore, although the foreground task is interrupted until the timer circuit 311 is again activated, this is because it is intended to allow the operator to execute the designating operations of the index image in steps 19 to 22. Step 18 relates to a process to return the display of the display 5 to the state at the interruption time point when the state of the interrupted foreground task is restarted later. Namely, step 18 relates to a process to preserve the contents in the display memory 319 to the disk 305.

In step 19, the index image is obtained via the external interface 313 from the image file apparatus 400 connected to the outside. In step 20, the index image is displayed onto the display 5. At the same time, in step 21, the image received at present, namely, the time and date file is expanded as mentioned above and, after that, the expanded image is displayed on the display 5.

In step 22, the index image number and the key word which are inputted by the operator are accepted. The index image number is a number which is unconditionally allocated to the index image stored in the image file apparatus 400. By supplying such an inputted number to the image file apparatus 400, the index image can be designated.

After completion of the index designating operation, in step 23, the contents in the display memory preserved in step 18 are read out from the disk 305 and returned to the display memory 319. In step 24, the timer circuit 311 is again activated. Consequently, the foreground task is restarted from this time point.

In steps 25 and 26, the index image number and key work which were determined as results of the above processes are transmitted to the image file apparatus 400. In step 27, the time and date file is transmitted. In this instance, in the case where the image storing format of the image file apparatus 400 relates to the MH or MR compression mentioned above, the image data can be transmitted in the format as it is. However, in case of another format, the image of the time and data file is again converted into the image in such a format and, after that, the converted image data is transmitted.

In step 28, a preserved mark [*] indicating that the current time and date file has been transmitted to the image file apparatus 400 is written into the history file.

In step 29, the set file is checked and in the case where the deletion mode has been set to "YES", the time and date file on the disk 305 is deleted in step 30. After the image information received was processed, the processing routine is returned to step 1 and the apparatus prepares for the next reception.

FIG. 8 is a diagram showing the display of the history file formed by the control as mentioned above. Thus, the operator can know the history of the file received.

[ ] denotes that in the storage into the image file apparatus 400, the file received in the manual mode is not yet preserved in the image file apparatus 400. [*] denotes that the file received in the automatic mode has completely been preserved in the image file apparatus 400. [?] denotes that the file received in the automatic mode cannot be preserved because the image file apparatus 400 is not in the standby state.

Although the foregoing program has been stored in the ROM in the embodiment, it is also possible to construct in a manner such that the program stored in a medium such as a floppy disk or the like is read out from the FDD (not shown) and stored into the RAM and the program is executed.

As described above, after the received data was stored into the first memory means, the data stored in the first memory means is stored into the second memory means. Therefore, the image can be freely searched or the like in the second memory means and the using efficiency is improved.

What is claimed is:

1. A data processing apparatus at a reception side, said apparatus comprising:

a setting circuit adapted for, prior to receiving data from another apparatus at a transmission side, setting index information, to be correlated with received data, by an operator at said data processing apparatus at the reception side, the index information to be used in classifying the received data;

a receiver circuit adapted for receiving data from the other apparatus;

a memory for storing the data received by said receiver circuit in a storing medium; and a control circuit adapted for controlling said memory such that, each time when the data received by said receiver circuit is being stored in the storing medium, the index information set by the operator at said data processing apparatus at the reception side is automatically correlated with the received data from the transmission side and stored in the storing medium.

2. An apparatus according to claim 1, further comprising a retrieving circuit connected to the storing medium, said retrieving circuit adapted for retrieving the data stored in the storing medium by searching the index information stored in the storing medium consistent with index information inputted by the operator during a search.

3. An apparatus according to claim 1, wherein the data is image data.

4. An apparatus according to claim 1, wherein the index information is selected from a plurality of bodies of previously-stored index information so as to be set by the operator.

5. A receiving control method operative in a data receiving apparatus at a receiving side for controlling receipt of items of data by the data receiving apparatus, comprising:

a first mode comprising:
  a setting step of, prior to receiving first data from another apparatus at a transmission side, setting first index information, to be correlated with received first data, by an operator at the receiving side,
  a first receiving step of receiving first data from the other apparatus at the transmission side, and
  a first storing step of storing the received first data in a storing medium, wherein in said first storing step each time first data is received, the received first data is concurrently correlated with the first index information previously set at said setting step and the received first data and its correlated first index information are stored in the storing medium in association with each other; and a second mode comprising:
  a second receiving step of receiving second data from the apparatus at the transmission side, and
  a second storing step of storing the received second data in the storing medium, wherein in said second storing step each time second data is received, second index information is set at the apparatus at the receiving side and concurrently correlated with the received second data and the received second data and its correlated second index information are stored in the storing medium in association with each other.

6. A method according to claim 5, further comprising a retrieving step of retrieving the first and second data stored in the storing medium by searching the index information stored in the storing medium consistent with index information inputted by the operator during a search.

7. A method according to claim 5, wherein the first and second data are image data.

8. A method according to claim 5, wherein the index information is selected from a plurality of bodies of previously stored index information so as to be set by the operator.

9. A data processing method operative in a first data processing apparatus at a reception side, said method comprising the steps of:

prior to receiving data from another apparatus at a transmission side, setting index information, to be correlated with received data, by an operator at the first data processing apparatus at the reception side, the index information to be used in classifying the received data;

receiving data from the other apparatus;

storing the data received in said receiving step in a storing medium; and controlling said storing step such that, each time when the data received in said receiving step is being stored in the storing medium, the index information set by the operator at the data processing apparatus at the reception side is automatically correlated with the received data from the transmission side and stored in the storing medium.

10. A method according to claim 9, further comprising the step of retrieving, using a retrieving circuit connected to the storing medium, the data stored in the storing medium by searching the index information stored in the storing medium consistent with index information inputted by the operator during a search.

11. A method according to claim 9, wherein the data is image data.

12. A method according to claim 9, wherein the index information is selected from a plurality of bodies of previously-stored index information so as to be set by the operator.

13. A computer-readable storage medium storing a program for executing a data processing method operative in a first data processing apparatus at a reception side, the program comprising:

code for, prior to receiving data from another apparatus at a transmission side, setting index information, to be correlated with received data, by an operator at the first data processing apparatus at the reception side, the index information to be used in classifying the received data;

code for receiving data from the other apparatus;

code for storing the data received by said code for receiving in a storing medium; and code for controlling said code for receiving such that, each time when the data received by said code for receiving is being stored in the storing medium, the index information set by the operator at the data processing apparatus at the reception side is automatically correlated with the received data and stored in the storing medium.

14. A medium according to claim 13, wherein the program further comprises code for retrieving, using retrieving means connected to the storing medium, the data stored in the storing medium by searching the index information stored in the storing medium consistent with index information inputted by the operator during a search.

15. A medium according to claim 13, wherein the data is image data.

16. A medium according to claim 13, wherein the index information is selected from a plurality of bodies of previously-stored index information so as to be set by the operator.

17. A data receiving apparatus for controlling receipt of items of data, said data receiving apparatus comprising:

setting means for, prior to receiving first data from another apparatus at a transmission side, setting first index information, to be correlated with received first data, by an operator at said data receiving apparatus;

receiving means for receiving data from the other apparatus; and storing means for storing data into a storing medium;

wherein said data receiving apparatus is operative in a first mode wherein:

said receiving means receives first data from the other apparatus at the transmission side, and said storing means stores the received first data in a storing medium, wherein each time first data is received, the received first data is concurrently correlated with the first index information previously set by said setting means and said storing means stores the received first data and its correlated first index information in the storing medium in association with each other; and wherein said data receiving means is operative in a second mode wherein:

said receiving means receives second data from the apparatus at the transmission side, and said storing means stores the received second data in the storing medium, wherein each time second data is received, said setting means sets second index information that is concurrently correlated with the received second data and said storing means stores the received second data and its correlated second index information in the storing medium in association with each other.

18. An apparatus according to claim 17, further comprising retrieving means for retrieving the first and second data stored in the storing medium by searching the index information stored in the storing medium consistent with index information inputted by the operator during a search.

19. An apparatus according to claim 17, wherein the first and second data are image data.

20. An apparatus according to claim 17, wherein the index information is selected from a plurality of bodies of previously stored index information so as to be set by the operator.

21. A computer readable storage medium storing a program for executing a receiving control method operative in a data processing apparatus at a receiving side for controlling receipt of items of data by a data receiving apparatus, said method comprising:

a first mode comprising:

a setting step of, prior to receiving first data from another apparatus at a transmission side, setting first index information, to be correlated with received first data, by an operator at the receiving side, a first receiving step of receiving first data from the other apparatus at the transmission side, and a first storing step of storing the received first data in a storing medium, wherein in said first storing step each time first data is received, the received first data is concurrently correlated with the first index information previously set at said setting step and the received first data and its correlated first index information are stored in the storing medium in association with each other; and a second mode comprising:

a second receiving step of receiving second data from the apparatus at the transmission side, and a second storing step of storing the received second data in the storing medium, wherein in said second storing step each time second data is received, second index information is set at the apparatus at the receiving side and concurrently correlated with the received second data and the received second data and its correlated second index information are stored in the storing medium in association with each other.

22. A medium according to claim 21, wherein said method further comprises a retrieving step of retrieving the first and second data stored in the storing medium by searching the index information stored in the storing medium consistent with index information inputted by the operator during a search.

23. A medium according to claim 21, wherein the first and second data are image data.

24. A medium according to claim 21, wherein the index information is selected from a plurality of bodies of previously stored index information so as to be set by the operator.

* * * * *

UNITED STATES PATENT AND TRADEMARK OFFICE
CERTIFICATE OF CORRECTION

PATENT NO.   : 6,154,779
DATED        : November 28, 2000
INVENTOR(S)  : Kazuo Otani et al.

It is certified that error appears in the above-identified patent and that said Letters Patent is hereby corrected as shown below:

<u>Title page,</u>
Item [56], References Cited, U.S. PATENT DOCUMENTS, insert:
-- 5,384,835    1/1995      Wheller et al....379/96 --.
-- 5,343,560    8/1994      Takeda et al.....395/166 --.
-- 5,465,353    11/1995     Hull et al.........395/600 --.
-- 5,490,217    2/1996      Wang et al.......380/51 --.
-- 5,251,043    10/1993     Hamano et al....358/402 --.
-- 5,412,486    5/1995      Bannai et al......358/444 --.
-- 5,387,983    2/1995      Sugiura et al.....358/434 --.

Signed and Sealed this

Fifth Day of March, 2002

Attest:

Attesting Officer

JAMES E. ROGAN
Director of the United States Patent and Trademark Office